INVENTORS
DANIEL G. BILLS
KEITH A. WARREN
BY
ATTORNEYS

Jan. 17, 1967 D. G. BILLS ET AL 3,298,719
ULTRA-HIGH VACUUM COUPLING AND GASKET SUBASSEMBLY THEREFOR
Filed May 9, 1966 2 Sheets-Sheet 2

INVENTORS
DANIEL G. BILLS
KEITH A. WARREN
BY
ATTORNEYS

United States Patent Office 3,298,719
Patented Jan. 17, 1967

3,298,719
ULTRA-HIGH VACUUM COUPLING AND GASKET
SUBASSEMBLY THEREFOR
Daniel G. Bills and Keith A. Warren, both of Boulder, Colo., assignors to Granville - Phillips Company, Boulder, Colo., a corporation of Washington
Continuation of application Ser. No. 342,074, Feb. 3, 1964. This application May 9, 1966, Ser. No. 548,801
5 Claims. (Cl. 285—336)

This application is a continuation of my now abandoned application Serial No. 342,074, filed February 3, 1964.

This invention relates to ultra-high vacuum couplings and gasket subassemblies for use therein.

Pipe couplings and analogous fittings for use in systems operating at negative pressures less than $10^{-9}$ mm. of Hg, which is the ultra-high vacuum range, require specially designed seals that necessitate the solution of many problems having no counterpart in apparatus intended for use at ordinary pressures. Among these problems are the difficulties encountered in attempting to fill or plug the minute capillaries and channels which criss-cross the mating surfaces that must be sealed. Preservation of the seal geometry and the provision of a reproducible seal require that one of the mating surfaces be hard while the other is relatively soft. At extremely low operating pressures in the ultra-high vacuum range, however, the sealing stress required exceeds the yield-strength of the unconfined soft material by a factor of several-fold. Therefore, because the soft material is essentially incompressible when unconfined, some degree of confinement is required if the necessary sealing stress is to be developed therein. On the other hand, by completely confining the soft material, almost any sealing stress can be developed. While complete confinement appears to be the answer to the sealing problem in that it makes it possible to develop the required sealing stress in the soft material, it is, in fact, nearly as detrimental as no confinement at all due to the appreciable expense experienced in attempting to produce a completely confined gasket and associated supporting structure that does not also necessitate the use of sealing forces so high that they are completely impractical.

Thus, a compromise must be made between a completely confined seal and an unconfined one wherein by partial confinement of the soft material the necessary sealing stress can be developed and yet not require excessive coupling forces. A useable seal results in accordance with the teaching found herein when the required sealing stress can be developed in the soft gasket material without, at the same time, producing extrusion forces of a magnitude capable of extruding the gasket material out through the unconfined spaces left between surfaces of the gasket supporting structure.

Another requirement of an ultra-high vacuum seal is that it must be mass spectrometer leak-tight when assembled as well as during and after repeated bake-outs to 500° C. Also, it must remain completely free of oxide flakes or loose scale following bakeout. Low vapor pressure materials must necessarily be used and this requirement eliminates the presently known organic materials.

Structurally, an ultra-high vacuum coupling must also be able to withstand normal system forces without the seal failing. Examples of such forces are those imposed by other elements of the system during bakeout, the ones realized from mechanical loading while the system is being assembled, and those applied by external sources following assembly. Internal stresses resulting from welding and similar operations can also result in seal failure unless the coupling is designed to resist same.

Certain other noteworthy features relate more to the economy and utility of the seal rather than its ultimate reliability, but, are nonetheless important. Economy in fabrication demands that both mating parts of the coupling be symmetrical. They should also be rotatable about the axis of the joint, otherwise, integration into the system can become extremely difficult, if not impossible.

The ultra-high vacuum joint seals and couplings known in the prior art all fail to meet the above requirements in one or more significant respects. Many seal designs, for example, permit forces applied against elements connected to the coupling to be transmitted directly to the gasket resulting in plastic deformation of the latter and premature failure. Failures of this type are not limited to those caused by the application of external mechanical loading but may result from the expansion and contraction stresses created during high temperature bakeouts and subsequent cooling. Welded connections between the coupling and piping can also cause certain of the prior art flange configurations to work and produce deformation of the gasket.

Many of the prior art gasket designs are quite large, necessitating that they be fabricated from inexpensive materials such as copper which oxidizes badly on all surfaces exposed to air during high temperature bakeout. When disassembled, it is nearly impossible to keep the copper oxide scale out of the system where it fouls valves and otherwise contaminates the remaining components. The solution to the contamination problem is, of course, to fabricate the gasket out of a precious metal such as gold which does not oxidize appreciably; however, the cost of the gasket then becomes prohibitive due to its size. Ordinarily, couplings utilizing large gaskets also require excessive sealing forces to render them mass spectrometer leak-tight.

Small gaskets, on the other hand, create other problems although they can be fabricated economically from precious metals and generally require smaller sealing forces. Small gaskets are extremely difficult to handle without damaging or contaminating them and they are nearly impossible to install and remove without injuring the highly polished surfaces of the supporting structure. Fabrication is also a problem of no little significance. Even though the sealing forces required for gaskets of small cross-section are usually rather easily achieved, the tolerances also become more critical and present designs suffer from the disadvantage of being readily overloaded.

The prior art supporting structures for the gaskets are, likewise, subject to serious deficiencies. Many are unsymmetrical requiring male and female mating parts. Other designs are such that it becomes extremely difficult to machine and polish the gasket-engaging surfaces to the finish necessary to maintain the seal. Most all designs transfer system induced forces directly to the gasket and make no provision for limiting the force that can be applied to the latter thus often overloading same. All in all, none of the prior art ultra-high vacuum seals or supports therefor provide workable solutions to the above problems as each possesses one or more serious deficiencies that severely limit their utility for the intended purpose.

In accordance with the teaching of the instant invention, on the other hand, a demountable ultra-high vacuum coupling or joint seal has been provided which does, in fact, achieve most, if not all, the requirements for an ideal seal. First of all, it satisfies the fundamental requirement of producing a mass spectrometer leak-tight seal. The gasket itself is of small cross-section necessitating minimal sealing forces while the coupling elements used therewith prevent overloading so frequently associated with small seals. The size of the seal makes it adaptable to fabrication from a non-oxidizing material, such as a precious metal, fairly inexpensively. Fabrication, handling, insertion and removal problems are solved by mounting the gasket on a back-up ring that is quite rugged. All elements of the coupling assembly are symmetrical and rotatable about the joint axis thus simplifying fabrication and installation. Means are provided on the flange elements of the coupling to absorb system forces before they reach the gasket whether caused by external loads or internal forces developed as a result of bakeout.

It is, therefore, the principal object of the present invention to provide a novel and improved ultra-high vacuum demountable joint coupling and associated gasket.

A second object is the provision of a unique gasket subassembly that includes a rugged inexpensive back-up ring carrying a small fragile soft metal gasket.

Another objective of the invention herein claimed is to provide a flanged ultra-high vacuum coupling having bendable annular webs for attachment to the system piping which yield under distorting forces and prevent seal failures.

Still another objective is the provision of a self-centering gasket support ring that properly aligns the mating surfaces of the coupling with the gasket and also facilitates insertion and removal of the latter.

An additional object is the provision of a coupling assembly that produces adequate sealing forces while preventing overloading of the gasket.

Further objectives are to provide an ultra-high vacuum demountable coupling that is relatively easy to fabricate, inexpensive, versatile, rugged, simple, compact and reuseable.

Other objects will be in part apparent and in part pointed out specifically hereinafter in connection with the description of the drawings that follow, and in which.

Figure 1:
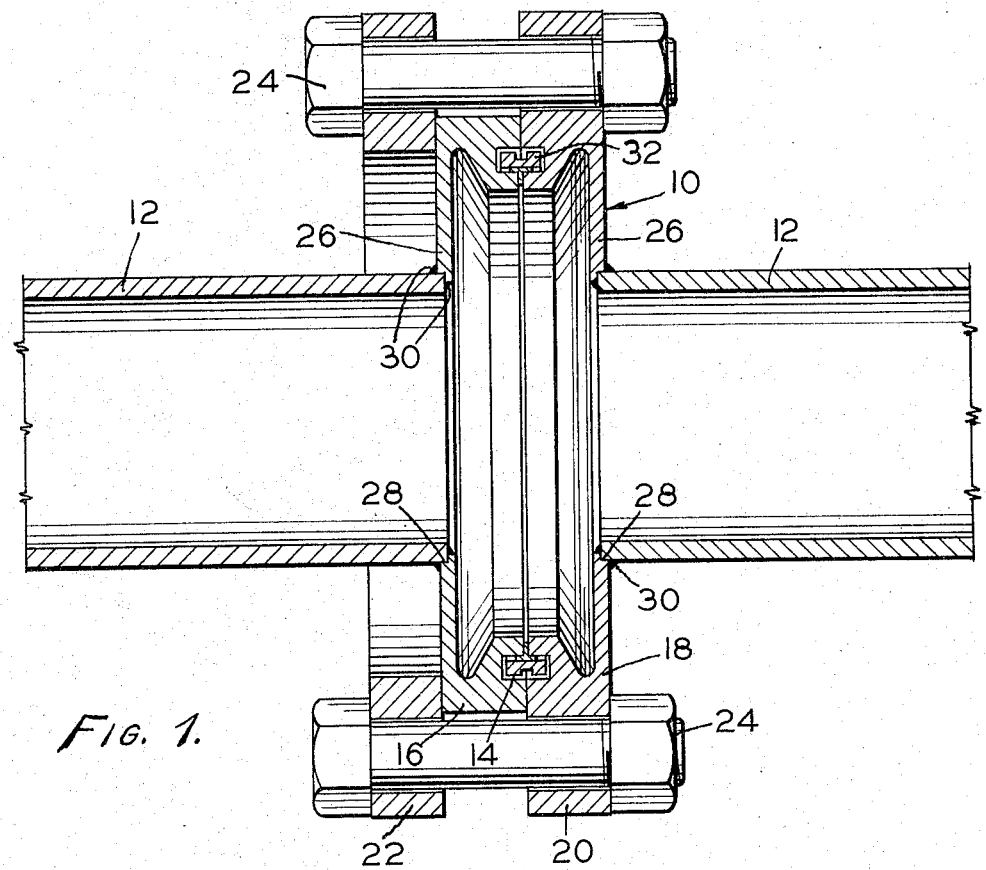
FIGURE 1 is a diametrical section showing the entire ultra-high vacuum demountable coupling assembly of the present invention together with associated system piping.
Figure 2:
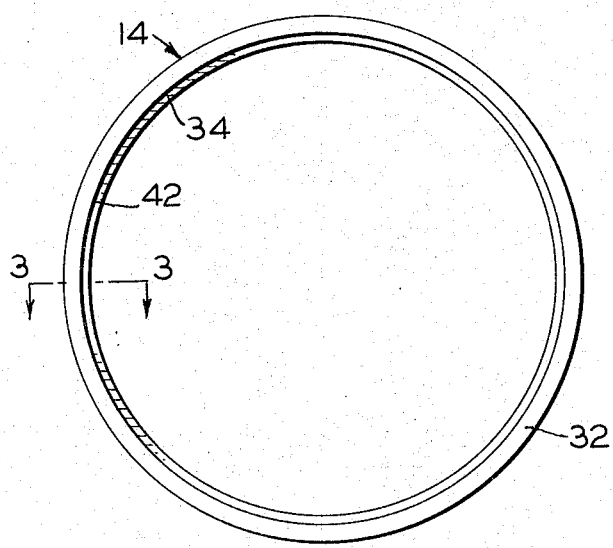
FIGURE 2 is a side elevation showing the gasket subassembly that includes the gasket and back-up ring therefor.
Figure 3:
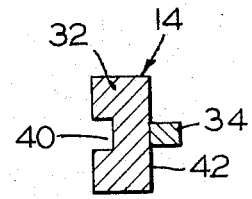
FIGURE 3 is a section taken along line 3—3 of FIGURE 2, but to an enlarged scale.

Referring now to the drawings for a detailed description of the invention and, initially, to FIGURE 1 for this purpose, it will be seen that reference numeral 10 has been employed to designate the coupling in its entirety that has been used to join pipe 12 of an ultra-high vacuum system together in essentially leakproof relation. Incorporated as a part of the coupling is a gasket subassembly that has been referred to broadly by reference numeral 14 and which will be described in detail presently.

Included among the several elements that go to make up the coupling are a pair of mating rings 16 and 18. These rings are essentially identical except that ring 18 has an integrally-formed flange 20 on its periphery that prevents it from turning after being fastened to the pipe while ring 16 remains rotatable about its axis at all times. Any combination of rotatable and non-rotatable rings can be used but the better practice is to include at least one rotatable ring to simplify assembly of the coupling. Ring 16 is held in assembled face-to-face relationship against flanged ring 18 by a detachable flange 22 which is fastened to the integral flange 20 by a plurality of bolts 24 with the ring 16 squeezed therebetween as shown. Flange 22 is made separate so that it can be rotated relative to the integral flange 20 until the bolt holes are aligned without requiring corresponding relative rotational movement of the rings which would score or otherwise damage the gasket and most likely destroy the seal. Note, however, that both rings 16 and 18 are internally symmetrical and, in fact, identical which means that they need not occupy any particular rotative position relative to one another. Also, although new gaskets must be used each time the coupling is disconnected and reassembled, these rings can be rotated to any new position in relation to each other without effecting subsequent seals. Their internal symmetry, of course, considerably simplifies their manufacture especially when compared with the prior art ultra-high vacuum couplings, many of which comprise unsymmetrical male and female mating parts.

The construction of rings 16 and 18 is unique among ultra-high vacuum couplings due to several features among which are the provision of integrally formed inwardly-extending flexible flanges 26 bordering the remote faces of these rings. The thickness of these flanges in relation to their width is such as to allow a limited flexion thereof that will prevent extraordinary compression, tension and bending loads applied through relative movement of the pipes 12 and in other ways from being transmitted to the interior seal-producing surfaces. While the tensile and compressive forces present in the system are not eliminated, these forces are taken up in the flexible flanges that are designed to carry same rather than being transmitted to the gasket which would fail if subjected thereto. The stresses transmitted across the coupling are, in fact, reduced because these same flanges prevent the build-up of excessive loads due to their flexibility.

These stress-relieving webs or flanges 26 are arranged at right angles to the direction of stress propagation and project outward radially from the system piping to which they are welded in leak-tight relationship. In the particular form shown, an annular groove 28 is formed along the inner exterior edge of each flange 26 to receive the pipe end and provide inner and outer corners to receive the welds 30.

The peripheral edge of each flange 26 lies well outside the area at which the seal is made so that any stress to be transferred across the joint will have to travel outwardly along the radial flange to the periphery of the rings 16 and 18. Before these stresses can move inwardly to the seal area; they will be intercepted by the rigid portions of the rings that lie in face-to-face mating relation and under substantial compression load.

As illustrated, flanges 26 are fabricated as integral parts of their respective rings which is the preferred construction; however, a relatively thin centrally-apertured disk welded to the remote faces of each ring could be used to decouple the seal area from the remainder of the system as far as stresses are concerned. Also, a lesser measure of stress relief could be accomplished by terminating the outer margin of the flexible flanges along a line equal to or even slightly less in diameter than that of the gasket provided the coupling was large in relation to the pipe diameter so as to provide an adequate flange width. In some applications, such as the one mentioned above, the latter flange design may be more practical, but, in most situations the effective diameter of the flange should be larger than the seal for best results as illustrated herein.

Another incidental, but significant, advantage derived from these stress-relieving flanges is the relief of loads produced by warpage occurring when the pipes are welded thereto. The internal stresses that occur during welding tend to warp the rings 16 and 18 but are prevented from doing so when these rings are equipped with flanges 26 as these flanges flex to dissipate such stresses before they reach the seal.

Before completing the description of the coupling 10, it would be advisable to examine the details of the gasket subassambly 14 for which purpose reference will be made to FIGURES 2–7, inclusive. This gasket subassembly consists of a hard metal carrier ring 32 to the inside cylindrical surface of which is fastened a soft metal gasket or sealing ring 34. The carrier ring is fabricated from some relatively inexpensive hard metal such as stainless steel that does not oxidize readily or otherwise produce contaminants that might find their way into the system. The sealing ring 34, on the other hand, is fabricated from a soft metal, preferably gold, which is easily deformed and free of contamination problems.

The carrier ring 32 provides several novel and useful functions. One of the most important is its ability to back-up and partially confine the small sealing ring while the latter is being deformed thus helping to make the seal. The carrier ring also provides means for handling the gasket subassembly without damaging the soft delicate sealing ring. Without such protection, it would be practically impossible to handle, apply or remove the gasket. By confining the sealing ring and preventing the latter from undergoing uncontrolled extrusion while the seal is being made, the carrier ring permits higher sealing stresses to be developed in the gasket. The sealing ring in the absence of the carrier ring tends to yield and flow out of the joint before a sufficiently high compressive stress is obtained to provide a satisfactory seal.

In addition, as will be shown presently, the carrier ring provides a guide that can be used to perform the combined functions of directing the sharp corners of the flange against the sealing ring and also keeping the mating elements of the flange in proper alignment. Furthermore, the carrier facilitates insertion and removal of the sealing ring so as to not damage the sealing surfaces.

The carrier ring is reuseable and permits the gasket materials which are usually precious metals to be salvaged. The gaskets can be replaced by merely fastening a new one in place on the carrier ring. This can be accomplished in several different ways. For example, in FIGURES 2, 3 and 6, the sealing ring 34 has been shown as having a rectangular cross-section and it is attached to the carrier ring 32 by swaging same against the serrated or otherwise roughened inner cylindrical surface 36 (FIGURE 6) of the carrier ring. In the modified form 14a shown in FIGURE 4, the carrier ring 32a is smooth-surfaced and the sealing ring 34a has a circular cross-section. The sealing ring 34a may be semi-permanently attached to the carrier ring in this modification by soldering, brazing or welding the two together. The third modification 14b illustrated in FIGURE 7 has the carrier ring 32b provided with a centrally-located, inwardly extending radial flange 38 onto the surface of which the sealing ring 34b is plated.

The various forms of the gasket subassembly have all been shown provided with an annular groove 40 in the outside cylindrical surface of the carrier ring located approximately midway between the planar faces thereof. This groove facilitates removal of the gasket subassembly as a screwdriver or other tool can be inserted therein to pry same from one of the flange halves.

Figure 4:
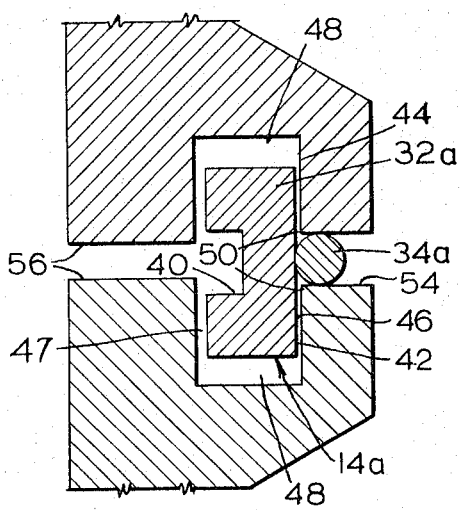
FIGURE 4 is a further enlarged fragmentary cross-section showing the gasket subassembly prior to formation of the seal and the associated elements of the coupling in position to mate therewith.
Figure 5:
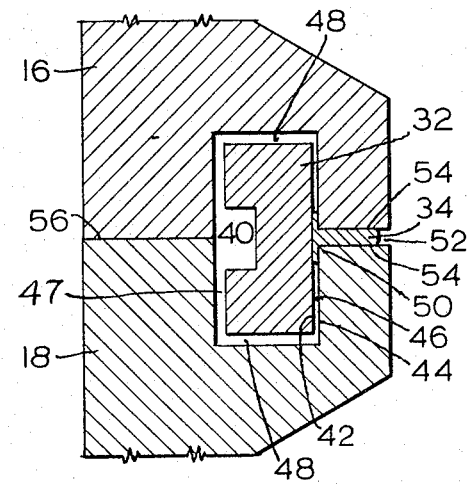
FIGURE 5 is an enlarged fragmentary section similar to FIGURE 4 showing the coupling assembly with the seal completed.
Figure 6:
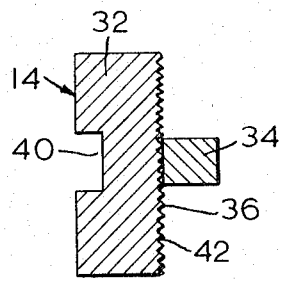
FIGURE 6 is a cross-sectional view similar to FIGURE 3 but further enlarged showing a modified form of the gasket subassembly.
Figure 7:
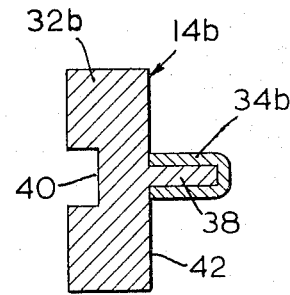
FIGURE 7 is a cross-sectional view similar to FIGURE 6 that reveals still another modified form of the gasket subassembly; and, FIGURE 8 is a further enlarged fragmentary section similar to FIGURE 5 showing the relationship of gasket thickness to length.

Finally, with reference to FIGURES 4 and 5, the manner in which the gasket subassembly cooperates with the flanges 16 and 18 of the coupling to produce the ultra-high vacuum seal will now be described in detail. The inner cylindrical surface 42 of the carrier ring is sized to slip over the mating exterior cylindrical surfaces 44 of the flanges thus centering the sealing ring 34 with respect to the centerline of the coupling. In the drawings, the gap 46 shown between these surfaces has been exaggerated to show how the gasket extrudes into this area as in FIGURE 5, however, in actual practice these surfaces have a rather close fit. On the other hand, a substantial gap is left between adjacent surfaces of the carrier ring and flanges at 47 on the outside of the gasket subassembly and also at the sides thereof as indicated at 48. In the preferred embodiment of the invention, the carrier ring is deformed from a circular shape into a slightly oval shape after the sealing ring is in place. Then, when the gasket subassembly is placed on one of the flanges, the carrier ring is sprung back into its original circular form, mounted on the flange and released so that it will grip the flange while assembly of the coupling is completed.

From the foregoing it can be seen that the gasket subassembly is self-centering and self-aligning with respect to the coupling. In a sense, it "floats" between the flanges. For all practical purposes, the only elements of the coupling that actually touch the gasket subassembly are the flange corners 50 that bite into the sealing ring.

Now, one of the most important features of the coupling is the means by which the flanges 16 and 18 cooperate with the gasket subassembly 14 to limit the degree of penetration of flange corners 50 into the sealing ring 34. The gap 52 left between the gasket-engaging faces 54 of the flanges 16 and 18 is determined by flange surfaces 56 as they are brought into face-to-face contacting relation with one another (FIGURE 5).

As aforementioned, to produce an ultra-high vacuum seal, it is necessary to fill or otherwise plug the minute capillaries which cross sealing surfaces 54 which is where the seal is produced. The compressive sealing stress that must be built up in the soft gasket material to achieve a seal is much higher than the stress at which the gasket material will extrude if unconfined. By partially confining the gasket material and forcing it to extrude around the corners 50 of the flanges along the inside cylindrical face of carrier ring 32, it becomes possible to build up sealing stress that far exceed the stresses required to extrude the gasket material in this manner. It remains, therefore, to determine how to build up the necessary sealing stress in the gasket.

Figure 8:
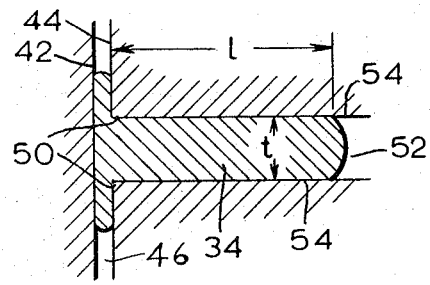

With reference to FIGURE 8, experiments have shown that if a gasket having a substantially circular cross section 34 is squeezed between seal-forming surfaces 54 until the gap therebetween 52 (i.e. the ultimate gasket thickness) is approximately one-half or less of the dimension "$l$" or final length of said gasket measured from the corners 50 to the inner free edge thereof, the necessary sealing stress will be developed. In other words, it appears that if $l \geq 2t$, an effeective seal will result.

Now, it should be mentioned that this formula may well vary with different materials because the sealing stresses developed depend upon such variables as the viscosity of the soft material, the surface friction between the hard and soft materials, the type of hard material, and the smoothness of the sealing surfaces. Excellent seals have been produced using Type 304 Stainless as the hard material from which the flanges are fabricated and gold as the gasket material. If the seal-forming surfaces are finished to 32 R.M.S. or better, then the above formula seems to hold true. Typical examples of gold-stainless seals that have proven entirely satisfactory are those in which the gasket thickness $t=.006''$ while its length $l=.012''$ to $.018''$. On the other hand, if the seal thickness ($t$) was left at $.010''$ to $.012''$ with a length of $.012''$ to $.018''$, the seals were not reliable.

Having thus described the many useful and novel features of the ultra-high vacuum coupling and gasket subassembly of the present invention, it will be seen that the several worthwhile objects for which it was designed have been achieved. Although but a few specific embodiments of the invention have been illustrated and described herein, we realize that certain changes and modifications may well occur to those skilled in the art within the broad teaching hereof; hence, it is our intention that the scope of protection afforded hereby shall be limited only insofar as said limitations are expressly set forth in the appended claims.

What is claimed is:

1. In combination:
   a pair of spaced flange members with a bore extending therethrough adapted for movement along a longitudinal axis toward each other;
   said flange members having sealing surfaces consisting of planar surfaces arranged in spaced face to face relationship and cylindrical surfaces having substantially the same diameters positioned radially outwardly of the wall defining said bore and being substantially parallel to the longitudinal axis, said cylindrical surfaces intersecting said planar surfaces to form substantially right angle corners therewith;
   stop means cooperating with said flange members to limit the movement of said planar surfaces thereof toward each other to provide a predetermined spacing therebetween not to exceed about 0.010 inch;
   carrier ring means made of relatively non-deformable metal, said ring means having a longitudinal dimension substantially greater than said predetermined spacing between said planar surfaces and positioned such as to overlie said space therebetween;
   a continuous annular deformable metal gasket means carried on the inner diameter of the carrier ring means and positioned for extrusion within the space between said planar surfaces;
   said gasket means being deformed when said predetermined spacing is established between said planar surfaces and said gasket means, before deformation, having a thickness measured along the longitudinal axis substantially greater than said predetermined spacing between said planar surfaces, and having a radial width approximately as great as its axial thickness;
   said ring means having an inner diameter greater than the diameter of said cylindrical surfaces of said flange members by an amount which is a small fraction of said predetermined spacing between said planar surfaces such that upon movement of said flange members toward each other along the longitudinal axis compressing said gasket means between said planar surfaces, said gasket means is extruded radially between same and longitudinally between the inner diameter surface of the carrier ring and said cylindrical surfaces; and
   said gasket means, after deformation, having a width measured radially which is at least two times said predetermined spacing between said planar surfaces; and in which the compressive stress within the gasket means generated at said right angle corners exceeds the normal yield stress of the gasket material by many times.

2. The joint according to claim 1 wherein said flanges and said carrier ring are made of stainless steel and said gasket is made of gold.

3. The combination of claim 1 wherein the gasket means in being extruded radially outwardly between said planar surfaces causes gasket material to be extruded around said substantially right angle corners formed by said intersecting planar and said cylindrical surfaces in a manner to provide trapping of high compressive stress between said corners and gasket material extruded inwardly between said planar surfaces.

4. For use with a pair of spaced flange members with a bore extending therethrough adapted for movement along a longitudinal axis toward each other;
   said flange members having sealing surfaces consisting of planar surfaces arranged in face to face relationship and cylindrical surfaces having substantially the same diameters positioned radially outwardly of said bore and substantially parallel to the longitudinal axis, said cylindrical surfaces intersecting said planar surfaces at substantially right angles to form corners;
   stop means cooperating with said flange members to limit the movement of said planar surfaces thereof toward each other and thereby establish a predetermined spacing between said surfaces;
   a carrier ring means made of relatively non-deformable metal, said ring having a longitudinal dimension substantially greater than said predetermined spacing between said planar surfaces;
   said inner diameter of the carrier ring means being greater than the diameter of said cylindrical surfaces and said ring means is positioned to overlie said space between said planar surfaces;
   the combination comprising a continuous annular gasket positioned between said planar surfaces;
   said gasket being deformed when said predetermined spacing is established between said planar surfaces;
   said predetermined spacing between said planar surfaces being limited by said stop means to not more than about 0.010 inch;
   said gasket, before deformation, having a thickness measured along the longitudinal axis substantially greater than said predetermined spacing between said planar surfaces;
   whereby upon movement of said flange members toward each other along the longitudinal axis said gasket is compressed between said planar surfaces and a first portion is caused to be extruded radially between said planar surfaces and a second portion is caused to be extruded longitudinally between inner diameter surface of the carrier ring and said cylindrical surfaces;
   the inner diameter of said ring being larger than the diameter of said cylindrical surfaces by an amount which is a small fraction of said predetermined spacing between said planar surfaces such that upon movement of said flange members toward each other along the longitudinal axis compressing said gasket means between said planar surfaces, said first portion of said gasket means is extruded radially between same and said second portion thereof is extruded longitudinally between the inner diameter surface of the ring means and said cylindrical surfaces; and
   said first portion of said gasket, after deformation, having a width measured radially which is at least two times said predetermined spacing between said planar surfaces; and in which the compressive stress in the gasket generated at said corners exceeds the normal yield stress of the gasket by more than several times.

5. The joint according to claim 4 wherein said flanges and said carrier ring are made of stainless steel and said gasket is made of gold.

References Cited by the Examiner

UNITED STATES PATENTS

| | | | |
|---|---|---|---|
| 323,956 | 8/1885 | Patterson | 285—336 |
| 332,906 | 12/1885 | Karwiese | 285—368 |
| 1,045,389 | 11/1912 | Gillmore et al. | 285—336 |
| 1,258,166 | 3/1918 | Vollmann | 285—336 |
| 2,083,228 | 6/1937 | Geyer | 285—423 X |

(Other references on following page)

UNITED STATES PATENTS

| | | | |
|---|---|---|---|
| 2,291,709 | 9/1942 | Goetze | 285—336 |
| 2,342,422 | 2/1944 | Morehead et al. | 285—350 X |
| 2,455,982 | 12/1948 | Dowty. | |
| 2,900,199 | 9/1959 | Logan | 285—363 X |
| 2,992,838 | 7/1961 | Wallace | 285—368 X |
| 3,078,110 | 2/1963 | Starr | 285—336 |
| 3,116,944 | 1/1964 | Parker. | |
| 3,208,758 | 9/1965 | Carlson et al. | 285—336 X |

FOREIGN PATENTS

| | | |
|---|---|---|
| 1,312,497 | 11/1962 | France. |
| 3,034 | 3/1901 | Great Britain. |
| 119,471 | 2/1919 | Great Britain. |
| 862,694 | 3/1961 | Great Britain. |

CARL W. TOMLIN, *Primary Examiner.*

T. A. LISLE, *Assistant Examiner.*